United States Patent [19]

Ando et al.

[11] Patent Number: 4,787,973
[45] Date of Patent: Nov. 29, 1988

[54] DEVICE FOR CONVERTING WATER INTO MINERAL WATER

[76] Inventors: Shoichiro Ando, Flower Bldg., Room #803 1-3-3 Nakameguro, Meguro-ku, Tokyo; Hiroshi Maki, 4-5-9 Ogawa, Machida-shi, Tokyo, both of Japan

[21] Appl. No.: 100,213

[22] Filed: Sep. 23, 1987

[51] Int. Cl.⁴ .............................. C02F 1/28; C02F 1/68
[52] U.S. Cl. .................................... 210/282; 210/484; 210/503
[58] Field of Search ............ 210/282, 474, 484, 502.1, 210/503

[56] References Cited

U.S. PATENT DOCUMENTS 3,327,859  6/1967  Pall ..................................... 210/503
4,094,779  6/1978  Behrman .............................. 210/282
4,664,812  5/1987  Klein .................................... 210/503
4,707,263  11/1987  Nishimori et al. ................. 210/282

FOREIGN PATENT DOCUMENTS 62-130795  8/1987  Japan .

Primary Examiner—Ivars Cintins
Attorney, Agent, or Firm—Frishauf, Holtz, Goodman & Woodward

[57] ABSTRACT

There is provided a device for converting water into mineral water which comprises a covered or uncovered porous filter and ceramic as a calcium and magnesium source and active carbon as a deodorizer randomly held in the filter whereby when water flows through the filter the water is converted into mineral water.

7 Claims, 4 Drawing Sheets

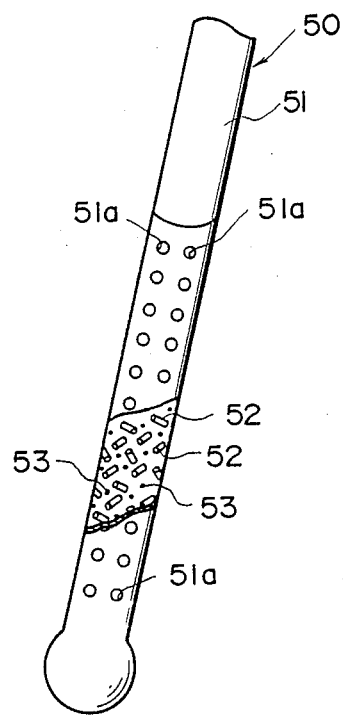

4,787,973

DEVICE FOR CONVERTING WATER INTO MINERAL WATER

BACKGROUND OF THE INVENTION

This invention relates to a device for converting water into mineral water and more particularly, to a device for converting city water into mineral water simply and instantly.

It has been generally recognized that mineral water is tasty and contains various inorganic ingredients dissolved therein. Among the inorganic ingredients dissolved in the mineral water, the presence of calcium and magnesium in a suitable amount in the mineral water is essential in order to improve the taste of the mineral water.

Especially, it has been pointed out that the taste of city water deteriorates when subjected to various industrial treatments. In order to convert city water into mineral water, an expensive industrial treatment or treatments of the water are required which makes it difficult to convert city water into mineral water by general customers themselves and they are compelled to buy ready-made mineral water in containers.

The inventors have endeavoured to solve the existing problem in converting city water into mineral water at home and in working places simply and instantly, and provided a device for converting water into mineral water which is adapted to convert city water into mineral water simply and instantly at home and in working places.

For attaining the object of the present invention, the device of the present invention comprises a filter in which ceramic pellets as a calcium and magnesium source and small active carbon masses as a deodorizer are randomly held for converting city water, for example, into mineral water simply and instantly.

According to the present invention, there has been provided a device for converting water into mineral water which comprises a porous filter and ceramic pellets as a calcium and magnesium source and small active carbon masses as a deodorizer.

The above and other objects and attendant advantages of the present invention will be more readily apparent to those skilled in the art from a reading of the following detailed description in conjunction with the accompanying drawings which show preferred embodiments of the invention for illustrating purpose only, but not for limiting the scope of the same in any way.

BRIEF DESCRIPTION OF THE DRAWINGS

FIG. 7 is a fragmentary substantially elevational view in partial section of a fifth embodiment of the device for converting water into mineral water constructed in accordance with the principle of the present invention.

PREFERRED EMBODIMENTS OF THE INVENTION

Figure 1:
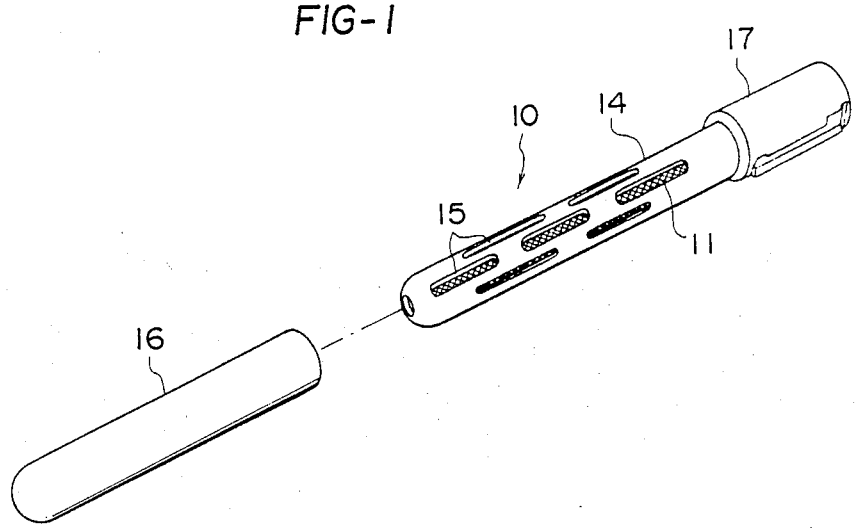
FIG. 1 is an exploded perspective view of a first embodiment of the device for converting water into mineral water constructed in accordance with the principle of the present invention.
Figure 2:
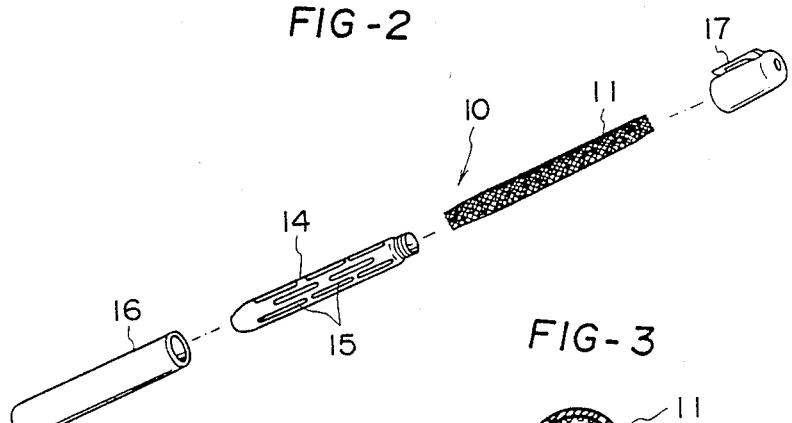
FIG. 2 is a further exploded perspective view on a reduced scale of the device shown in FIG. 1.
Figure 3:
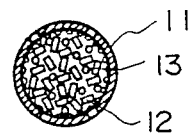
FIG. 3 is a cross-sectional view of an enlarged scale of the device shown in FIGS. 1 and 2.

The present invention will be now described referring to the accompanying drawings which show preferred embodiments of the invention for illustration purpose only. First, reference will be had on FIGS. 1 to 3 inclusive in which the first embodiment of the device for converting water into mineral water is shown. The device is generally shown by reference numeral 10 and comprises a sealed tubular porous bag of filter 11 which is formed of a piece of nonwoven fabric such as nylon, ceramic pellets 12 and small active carbon masses 13 both of which are randomly held in the bag 11, a tubular plastic inner case 14 receiving the porous bag 11 therein and having a plurality of discontinuous elongated slots 15 in the body thereof, said case being open at the opposite ends one of which is threaded, a tubular outer case 16 surrounding the inner case 14 except for the threaded end and an internally threaded cap 17 in threaded engagement with the threaded end of the inner case 14.

The ceramic 12 serves a calcium and magnesium source and has been sintered to a high temperature above 1200° C. The active carbon 13 serves as a deodorizer. The ceramic 12 and active carbon 13 are held in the amount ratio of 1:1 in the bag 11.

In use, the outer case 16 is slid off the body of the inner case 14 and the cap 17 is screwed out of the threaded end of the case 14. After the removal of the outer case 16 and cap 17 from the inner case 14, the inner case 14 having the ceramic and active carbon filled bag 11 therein is dipped into a container (not shown) holding a body of water such as city water and vigorously moved about to agitate the water for a predetermined time period until the calcium and magnesium dissolve out of the ceramic pellets 12 while the active carbon is deodorizing the water to thereby convert the water into mineral water.

Figure 4:
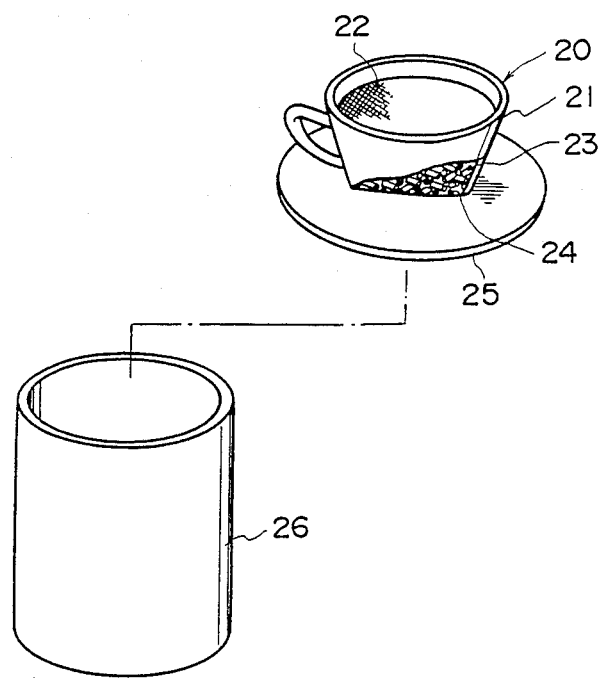
FIG. 4 is a perspective view of a second embodiment of the device for coverting water into mineral water constructed in accordance with the principle of the present invention.

Now, turning to FIG. 4 wherein the second embodiment of the device according to the present invention is shown. The second embodiment of the device is generally shown by reference numeral 20 and comprises a plastic filter including a body 21 in the form of a coffee cup open at the top and bottom and a net 22 stretched about the inner surface of the peripheral side wall of the body covering a substantial portion of the side wall except for a portion adjacent to the open top of the wall, ceramic pellets 23 and small active carbon masses 24 both of which are randomly held between the body side wall and net and a pedestal 25 positioned at the bottom of the cup shaped body 21 for stabilizing the body and having a center opening (not shown) in communication with the open bottom of the body. As in the case of the first embodiment, the ceramic and active carbon are employed in the amount ratio of 1:1 and the ceramic has been sintered to a temperature above 1,200° C.

In use, the device 20 is placed on the open top of a container 26 with the pedestal 25 seating on the container. City water, for example, is poured into the device 20 and flows through the net 22. The water dissolves the calcium and magnesium out of the ceramic pellets 23 as the water passes through the net 22 to convert itself into mineral water and flows down into the container 26 where the mineral water is held to be served for drinking.

Figure 5:
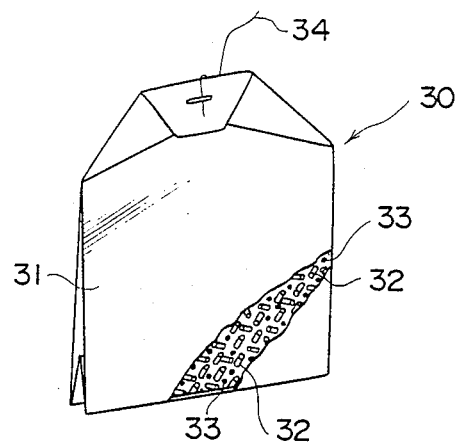
FIG. 5 is a perspective elevational view of a third embodiment of the device for converting water into mineral water constructed in accordance with the principle of the present invention.

Now turning to FIG. 5 in which the third embodiment of the device according to the present invention is illustrated. The device is generally shown by reference numeral 30 and comprises a filter 31 in the form of a porous tea bag formed of a piece of nonwoven fabric and ceramic pellets 33 and small active carbon masses 34 both of which are randomly held in the filter. The open top of the filter 31 is folded back to be closed and a suspension thread 34 is connected at one end to the closed top of the filter 31.

In use, the filter 31 in the form of a tea bag is placed into a cup (not shown) holding about 500 g of city water and suspended therein by means of the suspension thread 34 for about 30 seconds to dissolve the calcium and magnesium out of the ceramic to thereby convert the city water into meneral water. The amount of mineral water to be produced may vary by adjusting the amount of the ceramic pellets 32 and active carbon masses 33 to be employed.

Figure 6:
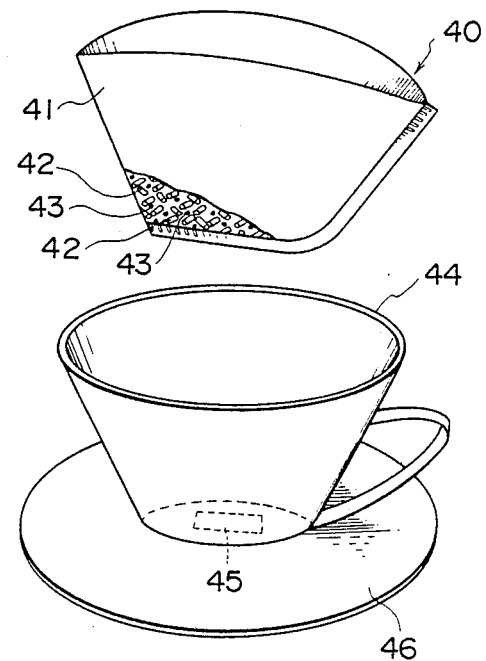
FIG. 6 is a perspective elevational view of a fourth embodiment of the device for converting water into mineral water constructed in accordance with the principle of the present invention.

FIG. 6 shows the fourth embodiment of the device according to the present invention. This embodiment of the device is generally shown by reference numeral 40 and comprises a filter 41 in the form an open top funnel formed of a piece of porous nonwoven fabric and ceramic pellets 42 and small active masses 43 both of which are randomly held in the filter 41. As in the preceding embodiments, the ceramic and active carbon are employed in the amount ratio of 1:1.

In the fourth embodiment, the ceramic pellets 42 and small active carbon masses 43 may be previously held in the funnel-shaped filter 41 or placed in a separate container (not shown) and then transferred into the filter 41 by means of a spoon or the like as desired.

In use, the filter 41 is placed into a cup or pot (not shown) and city water is poured into the filter 41. The city water dissolves the calcium and magnesium out of the ceramic pellets 42 as the water passes through the filter 41 and converts itself into mineral water. If necessary or desired, in order to stabilize the device, the device may be placed into a hard coffee cup-shaped case 44 which has an opening 45 at the bottom and a pedestal 46 positioned under the bottom of the case and having an opening in communication with the opening 45 and the cup or pot.

FIG. 7 shows the fifth embodiment of the device according to the present invention. This embodiment of the device is generally shown by reference numeral 50 and comprises a filter 51 in the form of a hollow stick formed of hard synthetic resin having a plurality of perforations 51a in a substantial portion of the stick and ceramic pellets 52 and small active carbon 53 randomly held in the stick filter 51. As in the preceding embodiments, the ceramic and active carbon are employed in the amount ratio of 1:1.

In use, the device is partially immersed into a cup or pot (not shown) holding a body of city water, for example, until the perforated portion of the filter 51 is submerged and then vigorously moved about in the body of water to dissolve the calcium and magnesium out of the ceramic to convert the city water into mineral water.

In any one of the foregoing embodiments, when silver particles are mixed with the ceramic pellets and active carbon masses, the silver particles exhibit perfect or partial sterilization effects on the city water.

As is clear from the foregoing description on the preferred embodiments of the invention, by the use of the device, city water can be easily and instantly converted into mineral water at home and/or in working places and since the ceramic pellets have been sintered to a high temperature above 1,200° C., the device is advantageous with respect to aspect of hygiene.

While several specific embodiments of the invention have been shown and described in detail, it will be understood that the same are for illustration purpose only, but not to be taken as a definition of the invention, reference being had for this purpose to the appended claims.

What is claimed is:

1. A device for converting water into mineral water, comprising:
    a tubular porous filter element;
    a tubular plastic inner case, said tubular porous filter element being received in said inner case, said inner case having a plurality of discontinuous elongated slots formed therein for passing water therethrough;
    said inner case having opposite ends each of which have openings, one of said opposite ends being externally threaded;
    a tubular plastic outer case surrounding said inner case except for said externally threaded end thereof;
    an internally threaded cap in threaded engagement with said externally threaded end of said inner case; and
    ceramic pellets as a calcium and magnesium source and small active carbon masses as a deodorizer randomly held in said tubular porous filter element.

2. The device of claim 1, wherein said filter element comprises a tubular porous filter bag.

3. The device of claim 1, wherein said ceramic and active carbon are provided in an amount ratio of 1:1.

4. The device of claim 1, wherein said outer case is removable from said inner case so as not to surround said inner case.

5. The device of claim 1, wherein said outer case is removable from said inner case so as to expose at least a plurality of said slots to water.

6. The device of claim 1, wherein said tubular porous filter element comprises a nonwoven fabric.

7. The device of claim 6, wherein said nonwoven fabric is nylon.

* * * * *